US009187138B2

(12) United States Patent
Newberry et al.

(10) Patent No.: US 9,187,138 B2
(45) Date of Patent: Nov. 17, 2015

(54) ROOF SPOILER MOUNTING SYSTEM

(71) Applicants: Bradley Charles Newberry, Huntsville (CA); Christopher Wade Campbell, Vineland (CA); Jani Petri Hamalainen, Hunstville (CA); Glenn David Steed, Ridgeville (CA); Michael Glenn Weber, Shelby Township, MI (US)

(72) Inventors: Bradley Charles Newberry, Huntsville (CA); Christopher Wade Campbell, Vineland (CA); Jani Petri Hamalainen, Hunstville (CA); Glenn David Steed, Ridgeville (CA); Michael Glenn Weber, Shelby Township, MI (US)

(73) Assignee: Tiercon Corp., Toronto, Ontario (CA)

( * ) Notice: Subject to any disclaimer, the term of this patent is extended or adjusted under 35 U.S.C. 154(b) by 0 days.

(21) Appl. No.: 14/394,162

(22) PCT Filed: Apr. 15, 2013

(86) PCT No.: PCT/US2013/036599
§ 371 (c)(1),
(2) Date: Oct. 13, 2014

(87) PCT Pub. No.: WO2013/155523
PCT Pub. Date: Oct. 17, 2013

(65) Prior Publication Data
US 2015/0084370 A1 Mar. 26, 2015

Related U.S. Application Data

(60) Provisional application No. 61/623,963, filed on Apr. 13, 2012.

(51) Int. Cl.
*B62D 35/00* (2006.01)

(52) U.S. Cl.
CPC .................................. *B62D 35/007* (2013.01)

(58) Field of Classification Search
CPC .............................. B62D 35/007; B62D 35/00
USPC ............................................... 296/180.1, 210
See application file for complete search history.

(56) References Cited

U.S. PATENT DOCUMENTS

| | | | | |
|---|---|---|---|---|
| 3,799,603 A | * | 3/1974 | Bott | 296/180.1 |
| 4,277,009 A | * | 7/1981 | Bott | 224/309 |
| 4,323,274 A | | 4/1982 | Soderberg et al. | |
| 4,339,145 A | | 7/1982 | Bott et al. | |
| 4,448,336 A | * | 5/1984 | Bott | 224/309 |
| 4,787,665 A | | 11/1988 | Rich | |
| 5,013,081 A | * | 5/1991 | Cronce et al. | 296/180.1 |
| 5,106,147 A | * | 4/1992 | Okada et al. | 296/180.1 |

(Continued)

FOREIGN PATENT DOCUMENTS

| | | |
|---|---|---|
| DE | 2913114 | 10/1990 |
| DE | 4004829 | 8/1991 |
| JP | 2007118650 | 5/2007 |

*Primary Examiner* — Jason S Morrow
(74) *Attorney, Agent, or Firm* — Miller Canfield

(57) ABSTRACT

A roof spoiler mounting bracket assembly for mounting a roof spoiler to a roof panel of an automotive vehicle. The mounting bracket assembly comprises a vehicle-side bracket having upper and lower sides extending longitudinally between first and second ends and laterally between first and second edges. A spoiler-side bracket having upper and lower sides extends longitudinally between first and second ends and laterally between first and second edges. The spoiler-side bracket has a unitary recessed section for receiving the vehicle-side bracket at least partially therein and the spoiler-side bracket is fixedly secured to the roof spoiler, A first mounting bolt extends from the lower side of the vehicle-side bracket for fixedly securing the vehicle-side bracket to the roof panel.

9 Claims, 5 Drawing Sheets

(56) References Cited

U.S. PATENT DOCUMENTS

| | | |
|---|---|---|
| 5,360,253 A | 11/1994 | Sasaki et al. |
| 6,267,281 B1 | 7/2001 | Nerling et al. |
| 6,612,642 B2 | 9/2003 | Kasahara |
| 7,399,024 B2 | 7/2008 | Ordonio et al. |
| 7,490,891 B2 | 2/2009 | Terakawa |

\* cited by examiner

ROOF SPOILER MOUNTING SYSTEM

RELATED APPLICATIONS

This application claims priority to and all the benefits of U.S. Provisional Application No. 61/623,963, filed Apr. 13, 2012, and entitled "Roof Spoiler Mounting System".

BACKGROUND OF THE INVENTION

1. Field of the Invention

The present invention relates to roof spoilers for automotive vehicles. More particularly, the present invention relates to a mounting system for securing a spoiler to a roof panel on an automotive vehicle.

2. Brief Description of Related Art

By way of background, roof spoilers are commonly attached to a rear end of a vehicle roof panel such that the roof spoiler is positioned directly above and overhanging a rear window. The purpose of the roof spoiler is primarily aesthetic. However, the roof spoiler may also provide some aerodynamic benefits by "spoiling" unfavorable air movement as the air passes over the roof panel, which can reduce drag and increase fuel efficiency.

Typically, roof spoilers are secured to the roof panel using two-sided adhesive tape and/or mounting bolts. Both of these attachment methods have drawbacks. Two-sided adhesive tape will eventually break-down, allowing the roof spoiler to come unsecured from the vehicle. If the roof spoiler comes unsecured from the vehicle during operation, this will present a safety issue to other vehicles travelling behind. On the other hand, mounting bolts extend through the roof spoiler into the roof panel to securely connect the roof spoiler to the vehicle. Bolt heads, however, are aesthetically unappealing and must generally be hidden from view in a recess formed in the roof spoiler that is covered over with an access panel. In addition, since holes must be drilled in the roof panel to receive the standard mounting bolts, there is a possibility that water will leak into the vehicle.

It is desirable, therefore, to provide a mounting system for securing a roof spoiler to a roof panel on an automotive vehicle that reduces or eliminates the above drawbacks.

SUMMARY OF THE INVENTION

According to one aspect of the invention, a roof spoiler mounting bracket assembly is provided for mounting a roof spoiler to a roof panel of an automotive vehicle. The mounting bracket assembly comprises a vehicle-side bracket having upper and lower sides extending longitudinally between first and second ends and laterally between first and second edges. A spoiler-side bracket having upper and lower sides extends longitudinally between first and second ends and laterally between first and second edges. The spoiler-side bracket has a unitary recessed section for receiving the vehicle-side bracket at least partially therein and the spoiler-side bracket is adapted to be fixedly secured to the roof spoiler. A first mounting bolt extends from the lower side of the vehicle-side bracket for fixedly securing the vehicle-side bracket to the roof panel. A second mounting bolt extends from the upper side of the vehicle-side bracket opposite the first mounting bolt for fixedly securing the vehicle-side bracket to the spoiler-side bracket and thereby mounting the roof spoiler to the roof panel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
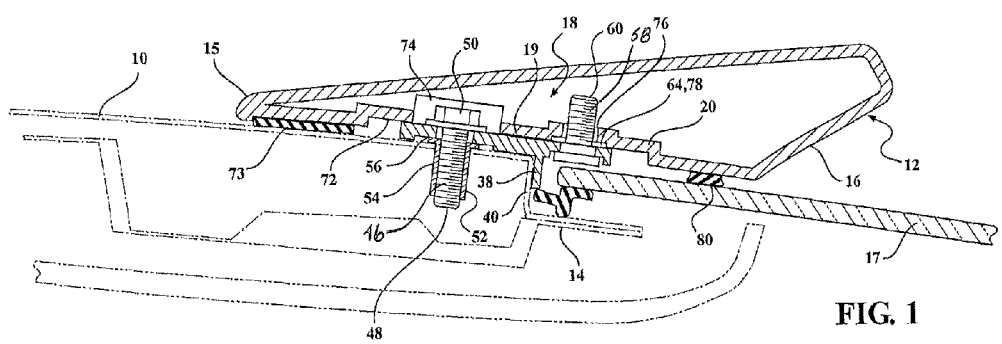
FIG. 1 is a cross-sectional view of a mounting system according to one embodiment of the invention for securing a roof spoiler to a vehicle roof panel.
Figure 3:
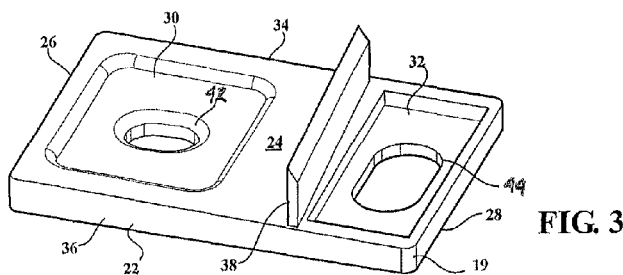
FIG. 3 is a perspective view of a lower side of a vehicle-side bracket of the mounting system.
Figure 2:
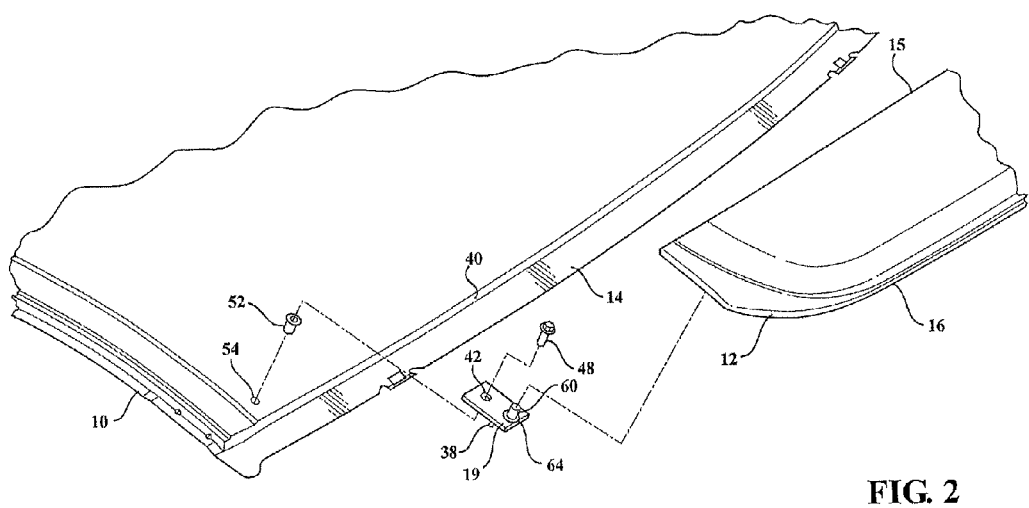
FIG. 2 is an exploded perspective view of the mounting system, roof spoiler and vehicle roof panel.
Figure 4:
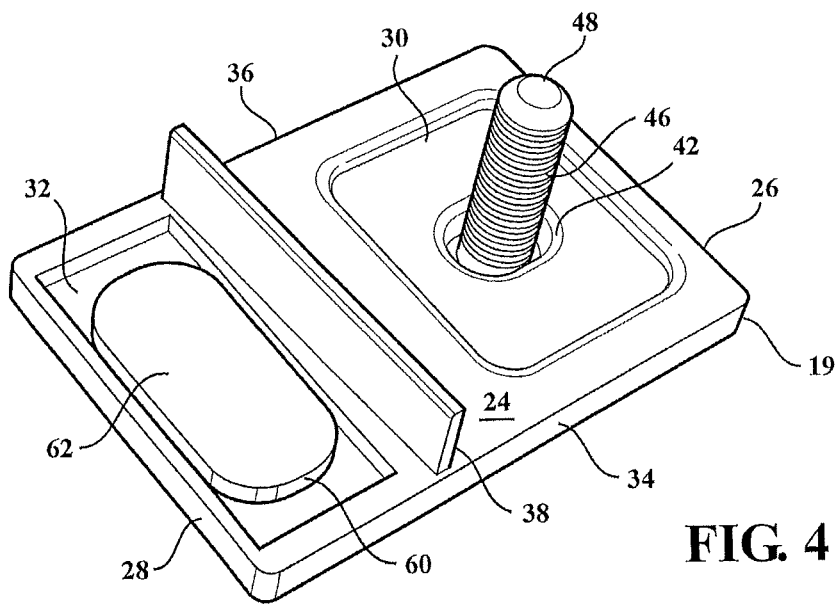
FIG. 4 is a perspective view of the lower side of the vehicle-side bracket including a mounting bolt and a T-bolt.
Figure 5:
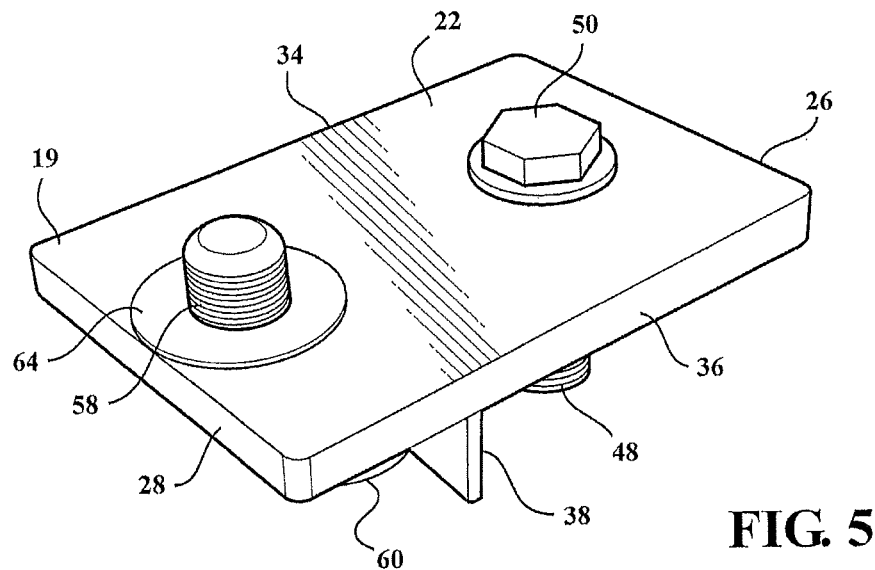
FIG. 5 is a perspective view of an upper side of the vehicle-side bracket including the mounting bolt and the T-bolt.

Referring to the Figures, a roof panel on a vehicle is indicated at 10 and includes a roof spoiler 12 fixedly secured thereto. The roof spoiler 12 extends along a rear edge 14 of the roof panel 10 in a lateral or cross-car direction. In the embodiment shown, the roof spoiler 12 extends in a longitudinal direction between a leading edge 15 and a trailing edge 16, wherein the trailing edge 16 overhangs a rear window 17. The roof spoiler 12 is secured to the roof panel 10 by a mounting system that includes one ore more mounting bracket assemblies 18 that are spaced apart in the lateral direction. Typically, the roof spoiler 12 is secured to the roof panel 10 with two or more bracket assemblies 18. Each bracket assembly 18 includes a vehicle-side bracket 19 and a spoiler-side bracket 20.

The vehicle-side bracket 19 is generally rectangular and includes an upper side 22 and a lower side 24. The vehicle-side bracket 19 extends in the longitudinal direction between a first end 26 and a second end 28. The lower side 24 includes a first recessed section 30 disposed generally toward the first end 26 and a second recessed section 32 disposed generally toward the second end 28. The vehicle-side bracket 19 also includes first and second edges 34, 36 that are spaced apart in the lateral direction and extend between the first and second ends 26, 28 thereof. A tab 38 is positioned on the lower side 24 of the vehicle-side bracket 19 between the first and second recessed sections 30, 32. The tab 38 extends in the lateral direction between the first and second edges 34, 36. The tab 38 abuts a lip 40 on the rear edge 14 of the roof panel 10 to locate the vehicle-side bracket 19. The lip 40 also prevents rotation of the vehicle-side bracket 19 when the vehicle-side bracket 19 is being secured to the roof panel 10. A first slot 42 extends through the vehicle-side bracket 19 such that it is generally centered within the first recessed section 30. The first slot 42 is elongated in the longitudinal direction. A second slot 44 extends through the vehicle-side bracket 19 such that it is generally centered within the second recessed section 32. The second slot 44 is elongated in the lateral direction.

A threaded shank 46 of a mounting bolt 48 extends through the first slot 42 such that a bolt head 50 is adjacent to the upper side 22 of the vehicle-side bracket 19. The shank 46 is threadably received in a blind rivet nut 52 that is seated in a bore hole 54 in the roof panel 10 to secure the vehicle-side bracket 19 to the roof panel 10. It is contemplated that the blind rivet nut 52 will have an under-head sealant which prevents liquid from entering the bore hole 54 around the blind rivet nut 52. In addition, sealant 56 is disposed in the first recessed section 30 which prevents liquid from entering the bore hole 54 from around the mounting bolt 48. It is appreciated that the first slot 42 provides a tolerance for the vehicle-side bracket 19 in the longitudinal direction to accommodate variations in distance between the lip 40 and the bore hole 54. In one embodiment, the tolerance is +/−1 mm.

A threaded shank 58 of a T-bolt 60 extends through the second slot 44 such that a head 62 of the T-bolt 60 is adjacent to the lower side 24 of the vehicle-side bracket 19. In other words, the shank 58 of the T-bolt 60 protrudes from the upper side 22 of the vehicle-side bracket 19. The T-bolt 60 is secured to the vehicle-side bracket 19 by a bolt retainer 64 on the upper side 22 of the vehicle-side bracket 19. It is appreciated that the second slot 44 provides a tolerance for the T-bolt 60 in the lateral direction to align the shank 58 of the T-bolt 60 with the spoiler-side bracket 20, as is described below.

Figure 6:
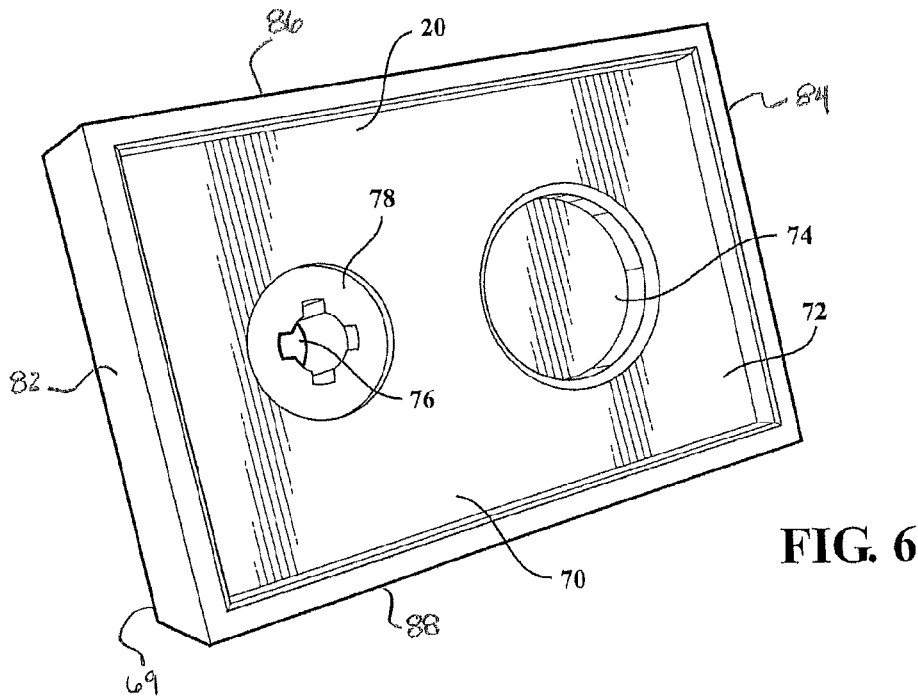
FIG. 6 is a perspective view of a lower side of a spoiler-side bracket of the mounting system.
Figure 7:
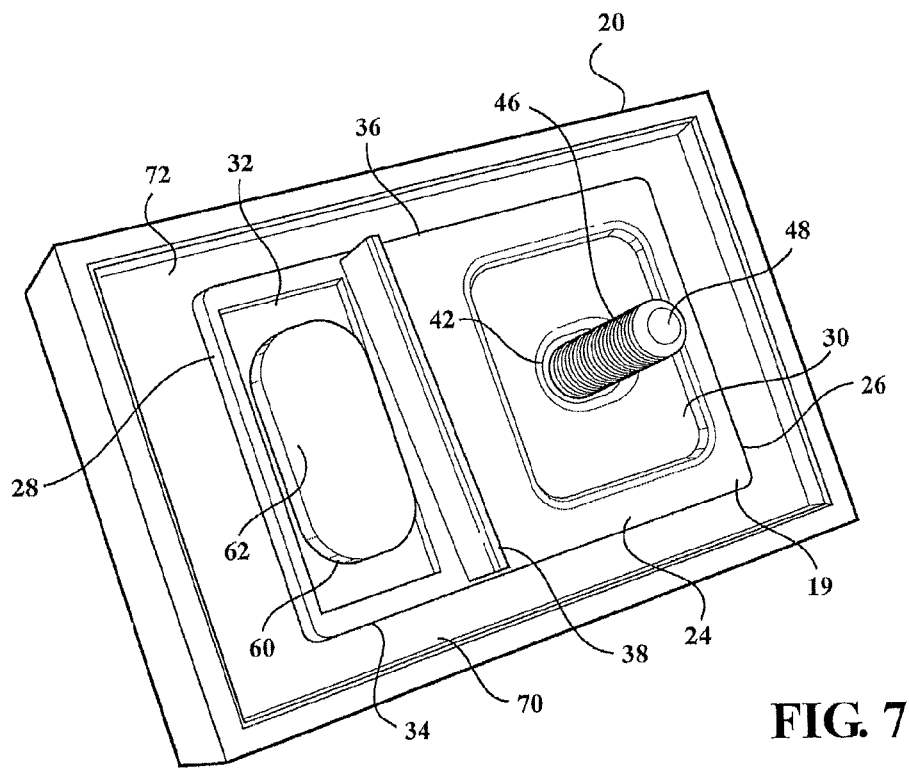
FIG. 7 is a perspective view of the vehicle-side bracket and the spoiler-side bracket joined together.
Figure 8:
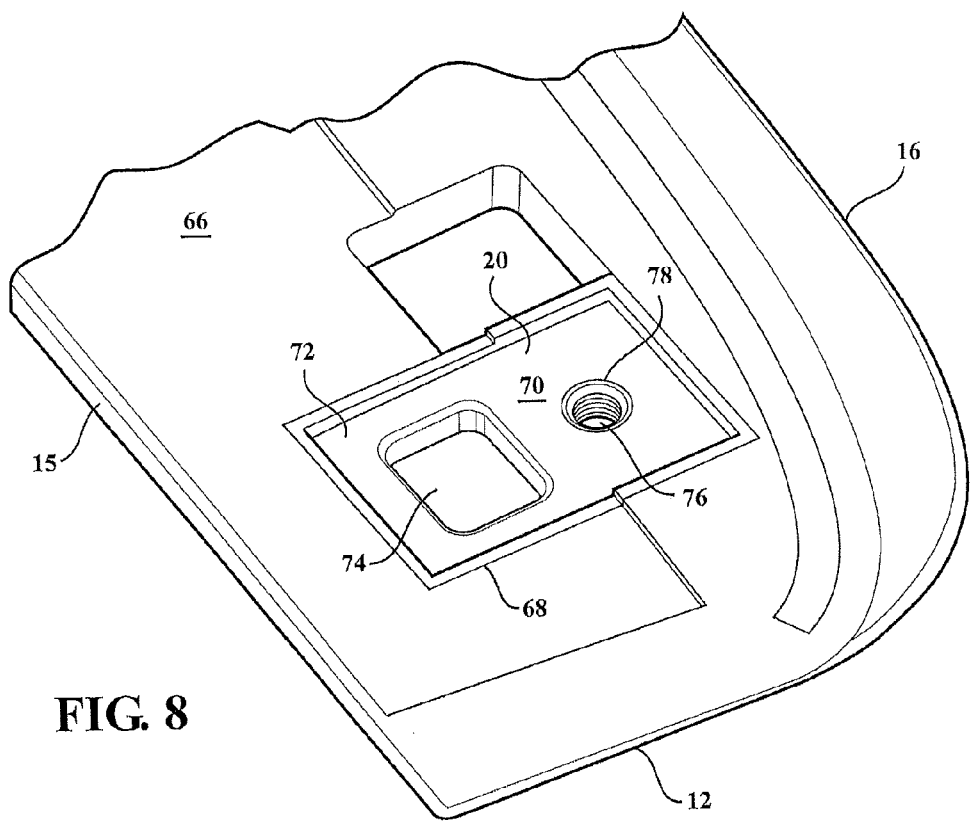
FIG. 8 is a perspective view of the spoiler-side bracket integrally formed with the roof spoiler.

The spoiler-side bracket 20 is generally rectangular and is integrally formed in an underside 66 of the spoiler 12. It is contemplated that the spoiler-side bracket 20 may be independent of the spoiler 12 and fixedly secured within a pocket 68 formed in the underside 66 of the spoiler 12 without varying from the scope of the invention. The spoiler-side bracket 20 includes an upper side 69 and an opposite a lower side 70 having a unitary recessed section 72 for receiving the vehicle-side bracket 19 therein when the spoiler 12 is mounted to the roof panel 10. The peripheral dimensions of the unitary recessed section 72 are larger than the peripheral dimensions of the vehicle-side bracket 19 to allow for fine adjustment of the spoiler 12 before securing the leading edge 15 of the spoiler 12 to the roof panel 10 with two sided tape 73, as shown in FIG. 1. The spoiler-side bracket 20 extends in the longitudinal direction between a first end 82 and a second end 84. The spoiler-side bracket 20 also includes first and second edges 86, 88 that are spaced apart in the lateral direction and extend between the first and second ends 82, 84 thereof. Within the confines of the peripheral dimensions of the unitary recessed section 72, the lower side 70 of the spoiler-side bracket 20 includes a recess 74 and a bore hole 76. The recess 74 and bore hole 76 are positioned to receive the bolt head 50 of the mounting bolt 48 and the shank 58 of the T-bolt 60, respectively, when the spoiler 12 is mounted to the roof panel 10. More specifically, when the spoiler 12 is mounted to the roof panel 10, the upper side 22 of the vehicle-side bracket 19 is directly adjacent to the lower side 70 of the spoiler-side bracket 20 such that the bolt head 50 of the mounting bolt 48 is disposed within the recess 74 and the shank 58 of the T-bolt 60 extends into the bore hole 76. A retainer 78 is integrally molded with the spoiler-side bracket 20 and encircles the bore hole 76, as shown in FIGS. 6 and 8. The retainer 78 engages the shank 58 of the T-bolt 60 to fixedly secure the spoiler-side bracket 20 to the vehicle-side bracket 19, thereby fixedly securing the spoiler 12 to the roof panel 10 on the vehicle. In addition, a rubber gasket 80 is secured to the underside 66 of the spoiler 12 adjacent to the trailing edge 16 and extends in the lateral direction. The rubber gasket 80 contacts the rear window 17 to support the trailing edge 16 of the spoiler 12 and also prevents dirt and liquid from backing-up under the spoiler 12.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A roof spoiler mounting bracket assembly for mounting a roof spoiler to a roof panel of an automotive vehicle, said mounting bracket assembly comprising;
   a vehicle-side bracket having upper and lower sides extending longitudinally between first and second ends and laterally between first and second edges;
   a spoiler-side bracket having upper and lower sides extending longitudinally between first and second end and laterally between first and second edges, said spoiler-side bracket having a unitary recessed section for receiving said vehicle-side bracket at least partially therein, said spoiler-side bracket adapted to be fixedly secured to the roof spoiler;
   a first mounting bolt extending from said lower side of said vehicle-side bracket for fixedly securing said vehicle-side bracket to the roof panel; and
   a second mounting bolt extending from said upper side of said vehicle-side bracket opposite said first mounting bolt for fixedly securing said vehicle-side bracket to said spoiler-side bracket and thereby mounting the roof spoiler to the roof panel; wherein
   said spoiler-side bracket further includes a bore hole extending through said upper and lower sides for receiving said second mounting bolt therethrough and a bolt retainer seated in said bore hole for engaging said second mounting bolt and fixedly securing said vehicle-side bracket to said spoiler-side bracket.

2. A roof spoiler mounting bracket assembly as set forth in claim 1 wherein said vehicle-side bracket further includes a first slot extending through said upper and lower sides for receiving said first mounting bolt therethrough, said first slot extending longitudinally between said first and second end of said vehicle-side bracket.

3. A roof spoiler mounting bracket assembly as set forth in claim 2 wherein said vehicle-side bracket further includes a second slot extending through said upper and lower sides for receiving said second mounting bolt therethrough, said second slot extending laterally between said first and second edge of said vehicle-side bracket.

4. A roof spoiler mounting bracket assembly as set forth in claim 3 wherein said first mounting bolt includes a threaded shank extending from a bolt head through said first slot from said upper side to said lower side of said vehicle-side bracket, wherein said threaded shank is adapted to be fixedly secured to the roof panel of the vehicle.

5. A roof spoiler mounting bracket assembly as set forth in claim 4 wherein said second mounting bolt includes a threaded shank extending from a bolt head through said second slot from said lower side to said upper side of said vehicle-side bracket, wherein said threaded shank of said second mounting bolt is received in said bore hole of said spoiler-side bracket and fixedly secured thereto by said bolt retainer.

6. A roof spoiler mounting bracket assembly as set forth in claim 5 wherein said spoiler-side bracket further includes a recess adjacent said bore hole for receiving and covering said bolt head of said first mounting bolt.

7. A roof spoiler mounting bracket assembly as set forth in claim 6 wherein said vehicle-side bracket includes a first recess section surrounding said first slot on said lower side of said vehicle-side bracket for sealing said first mounting bolt in said first slot.

8. A roof spoiler mounting bracket assembly as set forth in claim 7 wherein said vehicle-side bracket includes a second recess section surrounding said second slot on said lower side of said vehicle-side bracket for receiving said bolt head of said second mounting bolt.

9. A roof spoiler mounting bracket assembly as set forth in claim 8 wherein said vehicle-side bracket includes a tab projecting from said lower side thereof and extending laterally between said first and second edges for aligning said vehicle-side bracket with the roof panel and roof spoiler.

\* \* \* \* \*